(12) United States Patent
Kong et al.

(10) Patent No.: US 12,422,302 B2
(45) Date of Patent: Sep. 23, 2025

(54) INTEGRATED CIRCUIT SPECTROMETER

(71) Applicant: Agency for Science, Technology and Research, Singapore (SG)

(72) Inventors: Anmin Kong, Singapore (SG); Shaonan Zheng, Singapore (SG); Lennon Yao Ting Lee, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 112 days.

(21) Appl. No.: 18/550,949

(22) PCT Filed: Mar. 17, 2021

(86) PCT No.: PCT/SG2021/050141
§ 371 (c)(1),
(2) Date: Sep. 15, 2023

(87) PCT Pub. No.: WO2022/197240
PCT Pub. Date: Sep. 22, 2022

(65) Prior Publication Data
US 2024/0142303 A1 May 2, 2024

(51) Int. Cl.
*G06N 3/048* (2023.01)
*G01J 3/02* (2006.01)
(Continued)

(52) U.S. Cl.
CPC .............. *G01J 3/0259* (2013.01); *G01J 3/12* (2013.01); *G01J 3/2803* (2013.01); *G06N 3/048* (2023.01);
(Continued)

(58) Field of Classification Search
CPC .......... G01J 3/0259; G01J 3/12; G01J 3/2803; G01J 3/0218; G01J 2003/1213;
(Continued)

(56) References Cited

U.S. PATENT DOCUMENTS 8,456,620 B2 * 6/2013 Kruglick ............... G01J 5/0896
356/51
2011/0267610 A1 11/2011 Hu et al.
(Continued)

FOREIGN PATENT DOCUMENTS

CN           101871879 A     10/2010
CN           110554006 A * 12/2019           G01N 21/45
(Continued)

OTHER PUBLICATIONS

CN110554006A_Translation (Year: 2019).*
(Continued)

*Primary Examiner* — Tarifur R Chowdhury
*Assistant Examiner* — Carlos Perez-Guzman (57) ABSTRACT

An integrated circuit spectrometer comprises a photonic circuit comprising: an optical input port for receiving light from a light source: and a filter array of filter elements, such as microring resonators, in optical communication with the optical input port. Each microring resonator is characterized by a different series of resonance wavelengths. If alternative filter elements are used, the filter elements may have different filter peaks to each other. The integrated circuit spectrometer also comprises a plurality of detectors, each of which is associated with one of said microring resonators to detect photons from an output of the microring resonator: and at least one processor configured to reconstruct, from signals received at the detectors, an input spectrum of the light received at the optical input port. The input spectrum may be reconstructed by an artificial neural network.

12 Claims, 10 Drawing Sheets

(51) Int. Cl.
  *G01J 3/12*       (2006.01)
  *G01J 3/28*       (2006.01)
  *G02B 6/293*      (2006.01)
  *G06N 3/084*      (2023.01)

(52) U.S. Cl.
  CPC ...... *G06N 3/084* (2013.01); *G01J 2003/1213* (2013.01); *G02B 6/29343* (2013.01)

(58) Field of Classification Search
  CPC . G01J 2003/1269; G06N 3/048; G06N 3/084; G02B 6/29343; G02B 6/29341
  See application file for complete search history.

(56) References Cited

U.S. PATENT DOCUMENTS

| | | |
|---|---|---|
| 2013/0309135 A1 | 11/2013 | Park et al. |
| 2020/0217718 A1 | 7/2020 | Komljenovic |
| 2022/0179121 A1* | 6/2022 | Craddock ................ G06N 3/08 |

FOREIGN PATENT DOCUMENTS

| | | | |
|---|---|---|---|
| CN | 209784187 U | * | 12/2019 |
| WO | 2016125164 A2 | | 8/2016 |

OTHER PUBLICATIONS

CN209784187U_Translation (Year: 2019).*
International Search Report and Written Opinion issued Jun. 18, 2021 regarding International Application No. PCT/SG2021/050141, 11 pages.

* cited by examiner

INTEGRATED CIRCUIT SPECTROMETER

TECHNICAL FIELD

The present disclosure relates to an integrated circuit spectrometer.

BACKGROUND

Spectrometers are widely used in material and chemical analysis. Typical spectrometers consist of mechanical moving parts and bulky optical components. These are expensive instruments with a large footprint, and hence are usually restricted to laboratory use.

Miniaturized spectrometers integrated on photonic chips are beneficial for various applications, such as environmental sensing and process analytical technologies. On-chip spectrometers are desirable, especially in the mid-infrared (MIR), since chemicals and gases have much stronger absorption in the MIR than in the near infrared (NIR) range.

One type of previously devised miniature spectrometer achieves optical path variation by tuning the physical path length, for example using movable mirrors, and spectrum recovery is done by Fourier-transform methods. A disadvantage of such devices is that long optical paths are required to achieve high performance, thus limiting the degree to which the device can be miniaturized. Another disadvantage is the requirement of moving mirrors, which makes such systems less robust to vibrations and external influences.

Other types of spectrometer use dispersion-based methods such as arrayed waveguide gratings (AWG), planar concave gratings (PCG), and filters. For AWG and PCG, large channel count and large footprint are required to obtain large bandwidth, due to the inherent trade-off between the resolution and channel count.

Conventionally, to realize spectral recovery using filter arrays, the bandwidth is equal to the free spectral range (FSR). However, to scale up the spectral range, large FSR is required, which is very hard to realize due to fabrication restrictions. Hence, it is difficult to scale up existing approaches to a broader spectral range, either due to tuning requirements, or due to the inherent trade-off between resolution and bandwidth.

It is desirable to address one or more of the above difficulties, or at least to provide a useful alternative.

SUMMARY

The present invention relates to an integrated circuit spectrometer comprising:
  a photonic circuit comprising:
    an optical input port for receiving light from a light source; and
    a filter array of microring resonators in optical communication with the optical input port, each microring resonator being characterized by a different series of resonance wavelengths;
  a plurality of detectors, each of which is associated with one of said microring resonators to detect photons from an output of the microring resonator; and
  at least one processor configured to reconstruct, from signals received at the detectors, an input spectrum of light received at the optical input port.

In some embodiments, the microring resonators are arranged in parallel. They may be optically coupled to the optical input port via a beam splitter that is arranged to split input light equally among the microring resonators.

In some embodiments, the photonic circuit, the detectors, and the at least one processor are on a single substrate.

In some embodiments, the detectors form a detector array. The detector array may be, for example, a MCT, InSb, InAs, PbS, PbSe, InGaAs, Si or Ge photodetector array.

In some embodiments, the detectors are thermal detectors selected from thermopile detectors, microbolometers, or pyrodetectors with absorbers having an absorption spectrum that covers the resonance wavelengths of the resonators.

In some embodiments, the at least one processor is configured to reconstruct the input spectrum using an artificial neural network.

The artificial neural network may comprise a plurality of hidden layers; and each hidden layer may feed into a batch normalization layer.

In some embodiments, outputs of respective batch normalization layers feed into respective layers that transform the outputs according to a leaky ReLU activation function.

In some embodiments, the artificial neural network comprises a ReLU layer after an output layer, for constraining the output layer.

The present invention also relates to a filter array for an integrated circuit spectrometer, the filter array comprising a plurality of microring resonators for coupling to an optical input port of the integrated circuit spectrometer, each microring resonator being characterized by a different series of resonance wavelengths; wherein each microring resonator has an output for coupling to a respective detector of a plurality of detectors, for reconstruction, based on signals received at the detectors, of an input spectrum of light received at the optical input port.

In some embodiments of the filter array, the microring resonators are arranged in parallel. In some examples, the microring resonators may be configured for optical coupling to the optical input port via a beam splitter that is arranged to split input light equally among the microring resonators.

In some embodiments, the filter array is on the same substrate as the plurality of detectors.

The present invention further relates to a method of spectrometry, comprising, by at least one processor:
  receiving signals from a plurality of detectors, wherein each detector is arranged to receive optical signals produced by one of a plurality of microring resonators on receiving light having an input spectrum, each microring resonator being characterized by a different series of resonance wavelengths; and
  reconstructing the input spectrum using an artificial neural network.

In some embodiments of the method, the artificial neural network comprises a plurality of hidden layers; and each hidden layer feeds into a batch normalization layer.

In some embodiments of the method, outputs of respective batch normalization layers feed into respective layers that transform the outputs according to a leaky ReLU activation function.

In some embodiments of the method, the artificial neural network comprises a ReLU layer after an output layer, for constraining the output layer.

The present invention further relates to an integrated circuit spectrometer comprising:
  a photonic circuit comprising:
    an optical input port for receiving light from a light source; and
    a filter array in optical communication with the optical input port, wherein the filter array comprises a plurality of filter elements each arranged to generate a transmission spectrum containing a different filter peak or set of filter peaks;

a plurality of detectors, each of which is associated with one of said filter elements to detect photons from an output of the filter element; and at least one processor configured to reconstruct, from signals received at the detectors, an input spectrum of light received at the optical input port.

In some embodiments, the at least one processor is configured to reconstruct the input spectrum using an artificial neural network.

The artificial neural network may comprise a plurality of hidden layers; and each hidden layer may feed into a batch normalization layer.

In some embodiments, outputs of respective batch normalization layers feed into respective layers that transform the outputs according to a leaky ReLU activation function.

In some embodiments, the artificial neural network comprises a ReLU layer after an output layer, for constraining the output layer.

The filter elements may be microring resonators, Mach-Zehnder interferometer filters, or Bragg grating filters.

The filter elements may be arranged in parallel. For example, the filter elements may be optically coupled to the optical input port via a beam splitter that is arranged to split input light equally among the filter elements.

In some embodiments, the photonic circuit, the detectors, and the at least one processor are on a single substrate.

The detectors may form a detector array, such as a MCT, InSb, InAs, PbS, PbSe, InGaAs, Si or Ge photodetector array.

In some embodiments, the detectors are thermal detectors selected from thermopile detectors, microbolometers, or pyrodetectors with absorbers having an absorption spectrum that covers the filter peaks of the filter elements.

The present invention also relates to a method of spectrometry, comprising, by at least one processor:

receiving signals from a plurality of detectors, wherein each detector is arranged to receive optical signals produced by one of a plurality of filter elements of a filter array on receiving light having an input spectrum, each filter element being arranged to generate a transmission spectrum having a different filter peak or set of filter peaks; and reconstructing the input spectrum from said signals using an artificial neural network.

In some embodiments, the artificial neural network comprises a plurality of hidden layers; and each hidden layer feeds into a batch normalization layer.

In some embodiments, outputs of respective batch normalization layers feed into respective layers that transform the outputs according to a leaky ReLU activation function.

In some embodiments, the artificial neural network comprises a ReLU layer after an output layer, for constraining the output layer.

The present invention also relates to a system for spectrometry, comprising: memory; and at least one processor in communication with the memory; wherein the memory comprises instructions for causing the at least one processor to perform a method as disclosed herein.

The present invention further relates to non-transitory computer-readable storage comprising instructions for causing at least one processor to perform a method as disclosed herein.

BRIEF DESCRIPTION OF THE DRAWINGS

Some embodiments of an integrated circuit spectrometer, in accordance with present teachings will now be described, by way of non-limiting example only, with reference to the accompanying drawings in which.

DETAILED DESCRIPTION

Embodiments of the present invention relate to an integrated circuit spectrometer, also referred to herein as an on-chip spectrometer, comprising a filter array of microring resonators characterized by different resonant wavelengths. By providing an array of such microring resonators, multiple filter peaks within a broad working spectral range are obtained, without the need for tuning, thus providing compatibility with material platforms that lack an effective tuning method. Embodiments of the on-chip spectrometer may be integrated into devices such as portable spectrometers or miniaturized sensors by coupling to a sampling module, such as a gas cell or sensing head.

Further, in at least some embodiments, the input spectrum may be recovered using an artificial neural network. This avoids the need to search hyperparameter space, as is required by previously known spectrum reconstruction methods that use techniques such as regularized regression. The use of an artificial neural network also enables high resolution recovery of the input spectrum.

The bandwidth of the presently proposed spectrometer depends only on the material transparency window and waveguide transmission bandwidth, allowing broadband working. This spectrometer design and the spectrum reconstruction method pave the way for on-chip spectral analysis in various application scenarios.

Figure 1:
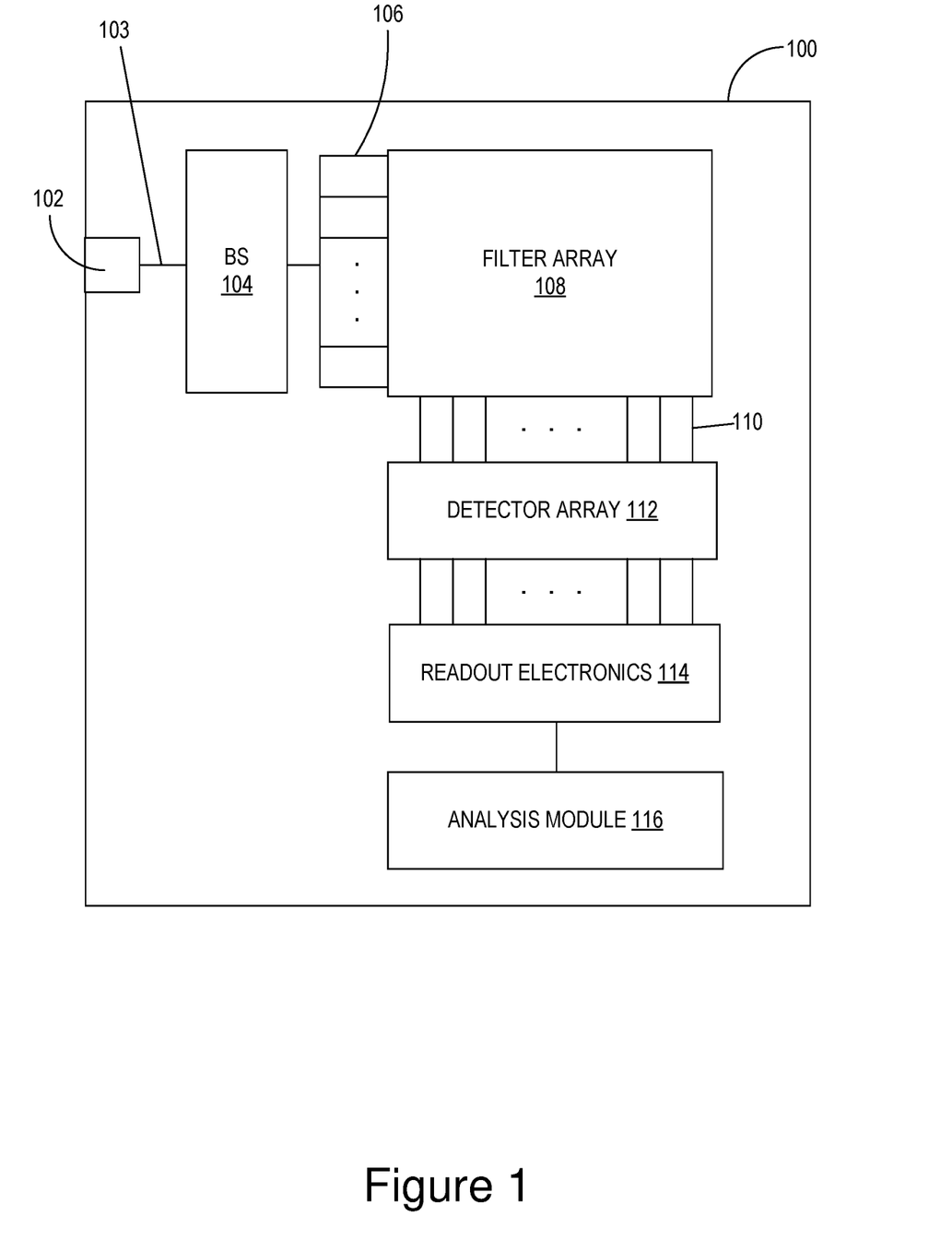
FIG. 1 is a block diagram of an example of an integrated circuit spectrometer.

Referring initially to FIG. 1, an embodiment of an integrated circuit spectrometer 100 comprises a photonic circuit comprising an optical input port 102, a beam splitter 104, and a filter array 108 that comprises a plurality of microring resonators each characterized by a different series of resonance wavelengths. The optical input port 102 is used to receive light from a light source. For example, the optical input port 102 may couple the integrated circuit spectrometer 100 to an optical fibre for receiving input light from the optical fibre. The optical fibre may receive transmitted radiation from a sampling module that is arranged to receive a sample for analysis, such that the sample can be subjected to a source of radiation. In other embodiments, different coupling techniques may be used to couple the light source to the spectrometer 100. For example, a grating/edge coupler, or a waveguide coupler in case of a bonded III-V source, may be used.

The input port 102 is coupled to beam splitter 104 via a waveguide 103. The beam splitter 104 splits the input beam into a plurality of beams that are coupled into respective microring resonators in the filter array 108 via waveguides 106. Each microring resonator in the filter array 108 receives an equal fraction of the input beam.

In some embodiments, the microring resonators may be replaced by alternative types of filter element. For example, filter array 108 may comprise a plurality of Bragg grating filter elements or a plurality of Mach-Zehnder interferometer filter elements, each arranged to produce a different filter peak or set of filter peaks in its transmission spectrum.

The spectrometer chip 100 may be partly or fully fabricated using CMOS-compatible microfabrication technology, for example. In this regard, a combination of processing techniques including lithography, epitaxy growth, dry etching, and the like may be used to fabricate the spectrometer chip 100, or at least part thereof. In some embodiments, certain components may be manufactured separately and then bonded or otherwise combined with the remaining components on a substrate to form the spectrometer chip 100. For example, the beam splitter 104, filter array 108 and detector array 112 may be fabricated separately and then combined with the readout electronics 114 and analysis module 116 of chip 100.

The materials of the various components of spectrometer chip 100 may be chosen based on the desired working spectral range. For example, for a chip that is to be used for spectrometry in the mid-infrared (MIR) range, Germanium may be used to fabricate the filter array 108 (and possibly other components such as beam splitter 104). For a chip 100 that is to be used for spectrometry in the visible and near infrared (NIR) range, $Si_3N_4$ may be used to fabricate the filter array 108.

Figure 2:
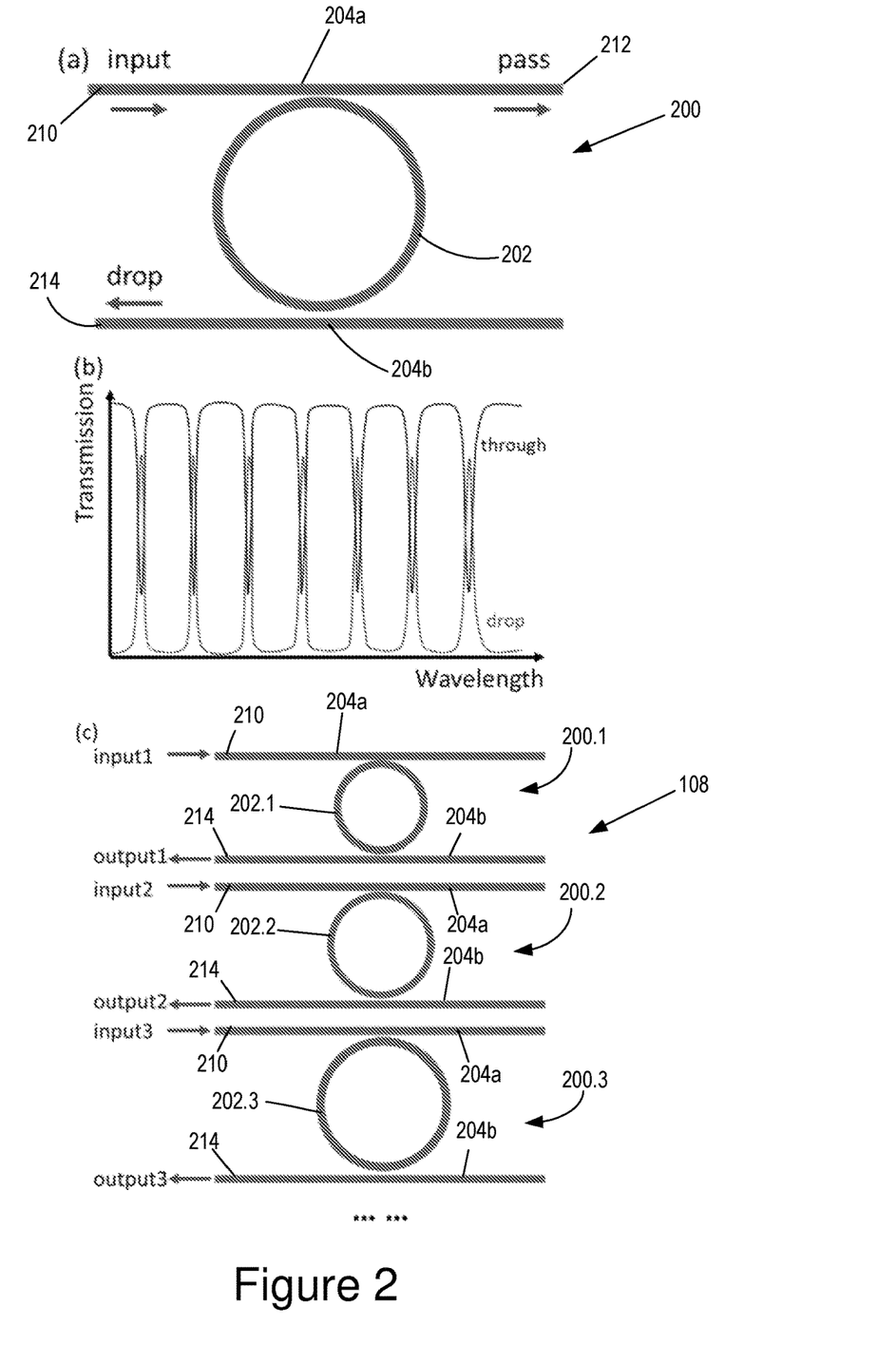
FIG. 2 shows example microring resonator structures of the integrated circuit spectrometer of FIG. 1, and a schematic output spectrum of a microring resonator.

A schematic illustration of a microring resonator 200 of the filter array 108 is shown in FIG. 2(a), and the transmission spectra of the microring resonator 200 are shown in FIG. 2(b). As shown in FIG. 2(b), the transmission spectrum contains a series of resonance wavelengths. It will be appreciated that the locations and spacings of the resonances vary according to the radius of the ring of the resonator 200. Accordingly, different resonators being characterized by different respective series of resonance wavelengths may be designed by varying their ring radii.

The microring resonator 200 comprises a ring waveguide 202 that is optically coupled to a pair of linear waveguides 204a and 204b. The first waveguide 204a has an input port 210 for receiving an input beam, some of which is coupled into the ring resonator 202 and some of which is transmitted to the pass port 212 of the first waveguide 204a. Light at the resonant wavelength of the ring waveguide 202 undergoes constructive interference within the ring waveguide 202, and is output at the drop port 214 of the second waveguide 204b. The microring resonator acts as a spectral filter, which allows light at the on-resonance wavelength to be output from the drop port 214.

A schematic layout of the filter array 108 is shown in FIG. 2(c). The filter array 108 comprises a plurality of microring resonators 200.1, 200.2, 200.3, etc. Only three resonators are shown, but it will be appreciated that many more resonators may be provided, depending on the resolution that is desired for spectral reconstruction.

Each resonator 200.1, 200.2, 200.3 has a respective ring waveguide 202.1, 202.2, 202.3, each of which is optically coupled to a first linear waveguide 204a having an input port 210 and a second linear waveguide 204b having an output port 214, as in FIG. 2(a). The resonators 200.1, 200.2, 200.3 differ in that the radius of the ring waveguides 202.1, 202.2, 202.3 are different from each other so as to provide different resonant wavelengths, such that each ring waveguide has a different spectral response. The plurality of microring resonators therefore act as a passive filter with multiple filter peaks in a broad working spectral range.

Figure 3:
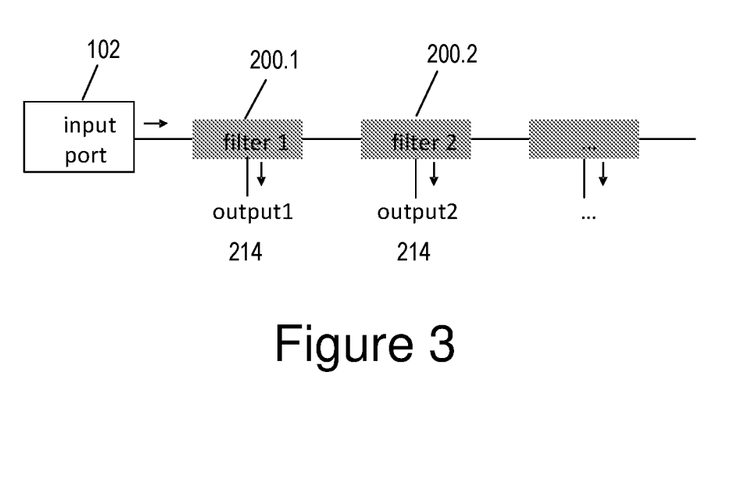
FIG. 3 shows a cascaded layout of microring resonators in an example of an integrated circuit spectrometer.

In the illustrated configuration, the resonators are arrayed in parallel. This is advantageous in that equal input power is delivered to each resonator. It will be appreciated that in some embodiments, other layouts are possible. For example, in some embodiments, a cascaded (series) layout may be used, as shown in FIG. 3. In a cascaded layout, an input beam is fed to the first filter 200.1. That part of the input that is at the resonant frequency of the first filter 200.1 passes to the output 214 of the first filter 200.1, while the remainder of the input passes to the next filter 200.2, and so on. Accordingly, the input power decreases in sequence, limiting the maximum number of filters, hence limiting the resolution. Hence, the parallel arrangement is advantageous. It will be appreciated that in some embodiments, a combination of filters arrayed in parallel and cascaded layout is possible.

Returning to FIG. 1, the filter array 108 is coupled to a detector array 112. Again this may be by way of waveguides 110, where each waveguide 110 couples one of the output ports 214 of one of the microring resonators 200.1, 200.2, 200.3 (etc.) to a detector of the detector array 112. Accordingly, each detector detects output light from a single microring resonator.

Any suitable detector having the desired spectral range and sensitivity may be used as part of the detector array 112. In some embodiments, the detectors of the detector array 112 may be photon detectors. For example, the detector array 112 may be an MCT, InSb, InAs, PbS, PbSe, InGaAs, Si or Ge photodetector array. In other embodiments, the detectors may be thermal detectors such as thermopile detectors, microbolometers, or pyrodetectors with absorbers having an absorption spectrum that covers the wavelength of interest.

The detector array 112 may be coupled to readout circuitry 114 to enable signals from the photon detectors of detector array 112 to be passed to an analysis module 116. The analysis module 116 may comprise, or may be implemented in, one or more processors that are configured to preprocess and analyse the detected signals, and in particular, to recover the input spectrum of the light received at optical input port 102.

For example, in some embodiments, the analysis module 116 may be configured to perform one or more of the following preprocessing operations: noise removal; filtering; integration; and averaging, in order to improve the SNR of the signal and to clean the signal before inputting the signal to a spectrum recovery process.

The analysis module 116 may be located on the same substrate as the photonic circuit, the detector array 112, and the readout electronics 114. Alternatively, in some embodiments, the analysis module 116 may be located remotely, and data recorded by the readout electronics 114 and, for example, stored in a memory component (not shown) of the spectrometer 100, may be transmitted in any suitable fashion to the remotely located analysis module 116 for spectrum recovery. For example, in some embodiments, the analysis module 116 may be implemented in software instructions executable by at least one processor of a computing device that is located remotely of the spectrometer.

The analysis module 116 may be configured to reconstruct the input spectrum as follows.

The detected optical power in a detector of detector array 112 is expressed as $$E = \int_{\lambda_1}^{\lambda_2} I_{in}(\lambda) T(\lambda) H(\lambda) G(\lambda) R(\lambda) d\lambda \quad (1)$$

where $I_{in}(\lambda)$ is the input spectrum, and $T(\lambda)$ is the transmission factor of the microring of the filter that is associated with the detector. $H(\lambda)$, $G(\lambda)$, and $R(\lambda)$ are wavelength dependent correction factors for imperfect beam splitters and optical losses, and detector responsivity respectively. Hence, the optical power can be written as $$E = \int_{\lambda_1}^{\lambda_2} I_{in}(\lambda) A(\lambda) d\lambda \quad (2)$$

where $A(\lambda) = T(\lambda) H(\lambda) G(\lambda) R(\lambda)$, which can be obtained by experimental characterization. By discretization, Eq. 2 can be written as $$E_i = \alpha_{i1} x_1 + \alpha_{i2} x_2 + \ldots + \alpha_{in} x_n \quad (3)$$

where n is infinity. So considering that there are m microring resonators 200 (each associated with a detector), the following equation is obtained:

$$y = Ax \quad (4)$$

where y is a m×1 column vector. It is measured from the detected power of m detectors. x is a n×1 column vector. It denotes the input spectrum (m<<n). To recover the input spectrum x, y can be measured, and x can be inferred. Since A can only be characterized with a finite n, the system is underconstrained and therefore, some techniques need to be performed to find the unique solution, i.e. the unique input spectrum. However, as mentioned above, previously known techniques rely on regularized regression, in which proper hyperparameter searching is difficult and inefficient. Hence, in embodiments of the present invention, an artificial neural network (ANN)-based method is used for spectral reconstruction. Based on Eq. 4, the input spectrum x can be modified as $$x = (A^T A)^{-1} A^T y = \beta y \quad (5)$$

where $\beta = (A^T A)^{-1} A^T$. Since $A^T A$ is a singular matrix (since m<<n), $(A^T A)^{-1}$ does not exist. Hence, an ANN is used to approximate matrix $\beta$.

The objective is to find an approximation for matrix $\beta$ which minimizes the mean square error (MSE) between the true spectrum x and the predicted spectrum $\hat{x}$. This optimization problem can be characterized as $$\hat{\beta} = \arg_\beta{}^{min} ||x - \hat{\beta} y||^2 \quad (6)$$

where y is a m×1 column vector that is constructed from the detected power of the m detectors associated with the m microring resonators of detector array 112. $\hat{x} = \hat{\beta} y$ is a n×1 column vector (m<<n), and is the predicted spectrum.

Figure 4:
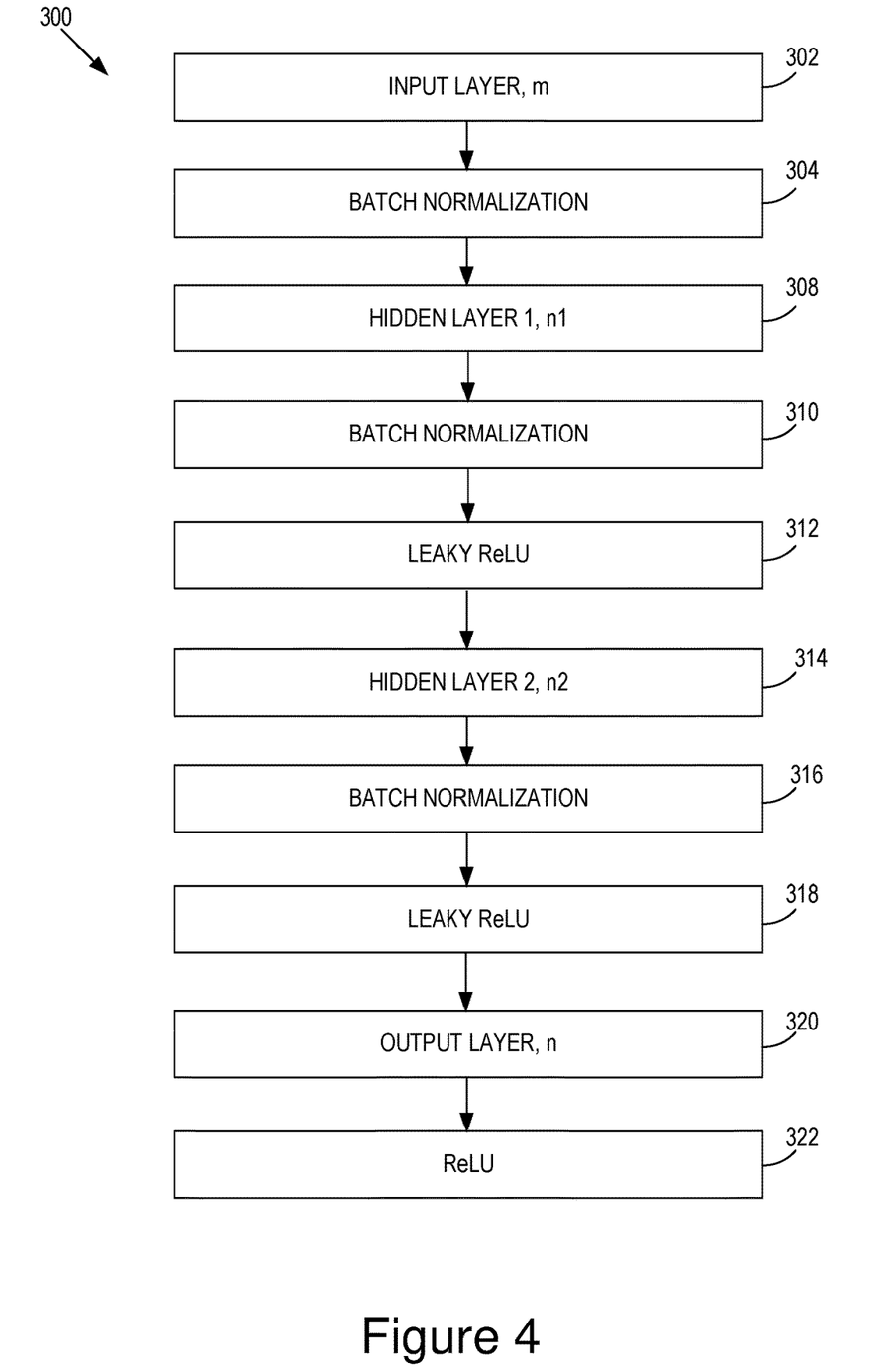
FIG. 4 shows a schematic architecture of an artificial neural network for reconstructing an input spectrum for the integrated circuit spectrometer of FIG. 1.

According to the universal approximation theorem, a feed-forward neural network with multiple hidden layers can approximate any measurable function from one finite-dimensional space to another. In some embodiments, a four-layer ANN may be used to approximate the non-linear function $\beta = (A^T A)^{-1} A^T$. One possible structure of a suitable ANN is shown in FIG. 4. The number of neurons in input layer 302 is m, which stands for the number of microrings/detectors. The number of neurons in output layer 320 is n, which stands for the number of wavelength points in the input spectrum. There are two hidden layers 308 and 314 in the proposed ANN 300. The number of neurons in hidden layer 1 (308) and hidden layer 2 (314) are defined as $n_1$ and $n_2$, respectively.

The present inventors have realized that the performance of the ANN 300 can be greatly reduced due to the change of the data distribution in between the ANN layers. To combat this issue, a batch normalization 304, 310, 316 is added after each layer. Thus, the output data after each layer has a similar distribution.

Leaky ReLU (312, 318) is applied as an activation function after batch normalization layer 310 and batch normalization layer 316. Leaky ReLU is applied instead of normal ReLU because the spectrum to be predicted has a linear portion. Leaky ReLU can help to keep this linear portion, and thus it can improve the ANN performance. In some embodiments, alternative activation functions such as the exponential linear unit (ELU) may be used. It has been found that Leaky ReLU has superior performance to such alternatives. Additionally, Leaky ReLU is hardware-friendly to implement compared to alternative activation functions.

A ReLU activation function 322 may be applied after the output layer 320. This serves to to add a constraint to the output layer, so that ANN 300 can focus on the optimization of the positive portion of the output. The simulation results below show that this method also helps to improve the system performance.

It will be appreciated that, in some embodiments, the accuracy of the spectrum reconstruction may be improved by increasing the number of hidden layers in the ANN 300, and/or by increasing the number of neurons in each hidden layer. If the number of hidden layers is increased, each hidden layer may feed into a batch norm layer followed by a leaky ReLU, in like fashion to hidden layers 308 and 314 in FIG. 4.

Spectrum Recovery Simulations

In Eq. 4, A is a m×n matrix. Note that n should typically be a very large value. Otherwise, the system model in Eq. 4 is not accurate. However, in a real environment, the resolution of the measured true spectrum is limited. In the following, the number of points in a measured true spectrum is denoted as $n_{GT}$. Clearly, n and $n_{GT}$ are two different values and $n >> n_{GT}$.

In the present simulation, n equals 5001. This is to make sure that the system can be accurately modeled using Eq. 4. The input spectrum x is a 5001×1 vector and the observation vector y is calculated directly using Eq. 4. The ground truth spectrum $x_{GT}$ is a $n_{GT}$×1 vector. It is a down-sampled version of the input spectrum x. In the present simulation, $n_{GT}$=501. Assume the number of microring resonators 200 is m, and the number of neurons in hidden layer 1 (308) and hidden layer 2 (314) is $n_1$ and $n_2$, respectively. The structure of the proposed ANN is denoted as $m \times n_1 \times n_2 \times n_{GT}$. For example, ANN model 64×512×1024×501 stands for an ANN where m=64, $n_1$=512, $n_2$=1024, and $n_{GT}$=501.

The data set used to train the ANN is generated as follows:
(a) Generate a 5001×1 vector x. Note that x is a random curve, which is an accumulation of L single pulses (L is a random number between 1 and 100). x is used as the true spectrum for Eq. 4.
(b) Calculate the m×1 observation vector y using Eq. 4.
(c) Generate the ground truth spectrum $x_{GT}$ by down-sampling x to a 501×1 vector.

(d) Use the m×1 observation vector y as the input to ANN 300 and use $x_{GT}$ as the ground truth.

In total, 6000 pairs of vectors {y, $x_{GT}$} are generated. 5000 pairs are used as a training set and the remaining 1000 pairs are used as a validation set.

Training of the ANN with the training data of the simulation data set may be achieved in any suitable fashion, for example by using gradient descent and backpropagation. Other optimization methods such as ASGD, RMSprop, or Adam may also be used for the training process.

Performance Evaluation Using Coefficient of Determination and MSE

The performance of the proposed ANN 300 was evaluated using the coefficient of determination (R-squared) and the MSE. Assume the ground truth spectrum $x_{GT}$ is a $n_{GT} \times 1$ vector and it can be expressed as $x_{GT}=[x_1, \ldots, x_n]^T$. $\hat{x}_{GT}=[\hat{x}_1, \ldots, \hat{x}_n]^T$ is the predicted spectrum. Define the residuals as $e=[e_1, \ldots, e_{n_{GT}}]^T$, where $e_i = x_i - \hat{x}_i$. The mean of the ground truth spectrum is defined as $$\bar{x} = \frac{1}{n_{GT}} \sum_{i=1}^{n_{GT}} x_i.$$

The total sum of squares can be calculated as $$SS_{tot} = \sum_{i=1}^{n_{GT}} (x_i - \bar{x}) \quad (7)$$

The residual sum of squares is defined as $$SS_{res} = \sum_{i=1}^{n_{GT}} (x_i - \hat{x}) \quad (8)$$

Thus, the definition of the coefficient of determination (R squared) can be expressed as:

$$R \text{ squared} = 1 - \frac{SS_{res}}{SS_{tot}} \quad (9)$$

In the best case, the predicted values exactly match the ground truth values, which results in $SS_{res}=0$ and R squared=1. A baseline model always predicts the mean value of the ground truth. In this case, R squared=0. Models that have worse predictions than the baseline will have a negative R squared.

Figure 5A:
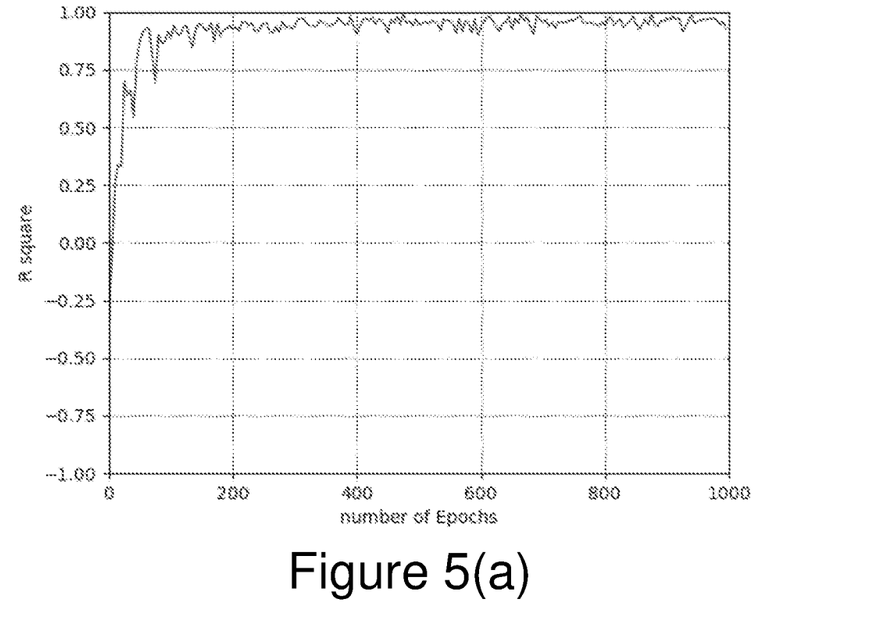
FIG. 5(a) shows the relationship between R-squared and the number of training epochs for training the artificial neural network of FIG. 4.
Figure 5B:
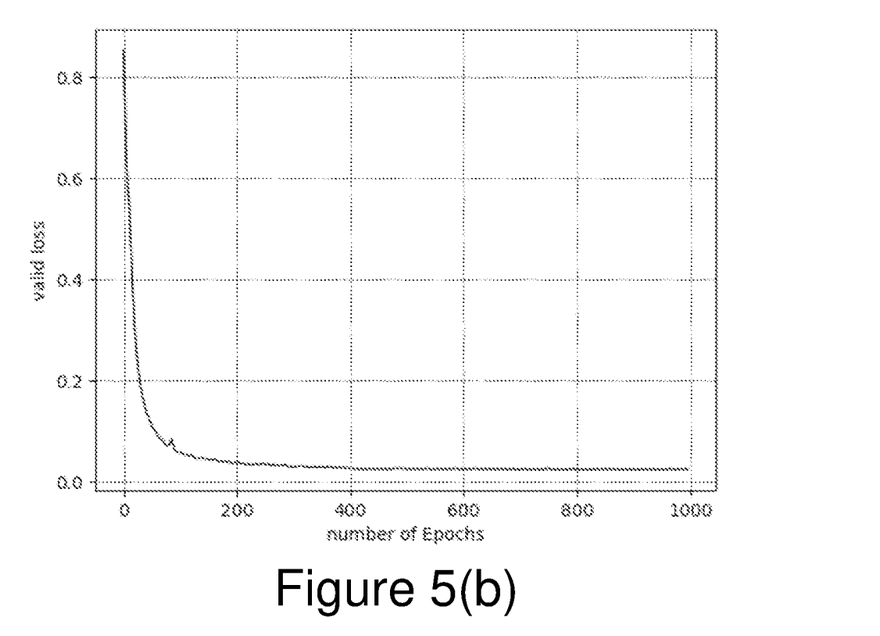
FIG. 5(b) shows the relationship between the valid loss and the number of training epochs for training the artificial neural network of FIG. 4.

FIG. 5(a) shows the relationship between the R squared value and the number of training epochs. It can be observed that after 200 epochs of training, R squared is stable and is very close to 1 (around 0.96). This means that the spectrum predicted by the ANN 300 is very close to the ground truth spectrum. FIG. 5(b) shows the relationship between the valid loss (MSE of the valid dataset) and the number of training epochs. It can be seen that the valid loss almost converges after 200 epochs.

Figure 6:
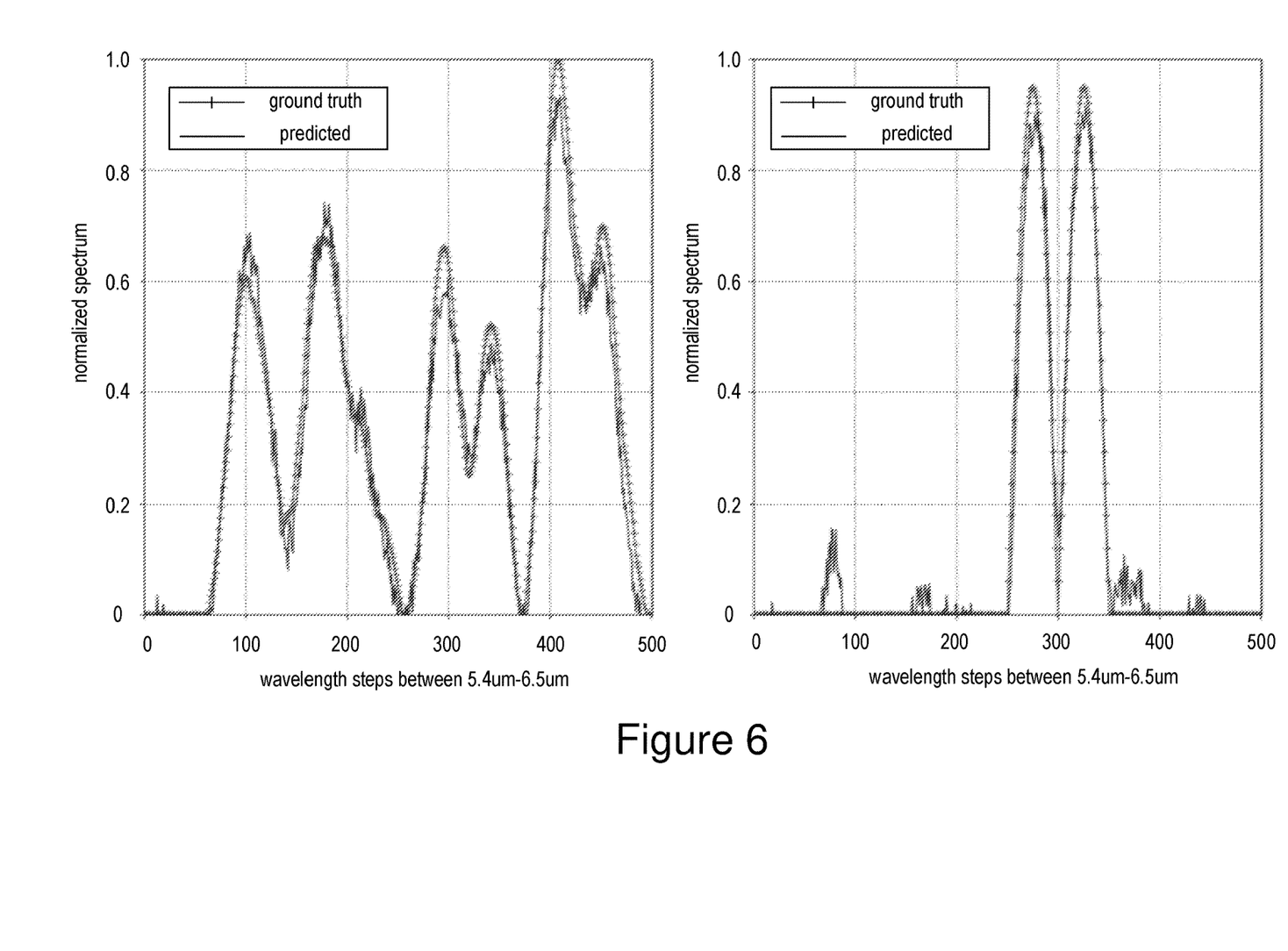
FIG. 6 shows the predicted (reconstructed) spectrum versus the ground truth spectrum for the artificial neural network of FIG. 4.

FIG. 6 shows a comparison between the predicted spectrum and the ground truth spectrum. Both the wide band and narrow band spectrums are compared. It can be observed that the predicted spectra and the ground truth spectra are almost the same, which shows that the proposed ANN 300 works very well on the testing data, no matter whether it is wide band or narrow band spectrum.

Relationship Between m Value and the Performance of the ANN

The number of neurons in input layer is m. Table 1 compares the performance of ANN 300 with different m values. The ANN model used in this simulation is m×512× 1024×501, where m is a variable and is either 40 and 64 in the simulation. Table 1 shows that both the valid MSE and the R squared value are improved with increasing m value.

TABLE 1

Performance of ANN with different m values.

| | m = 40 | m = 64 |
|---|---|---|
| MSE | 0.07314 | 0.02361 |
| Averaged R squared | 0.8673 | 0.9659 |

Figure 7A:
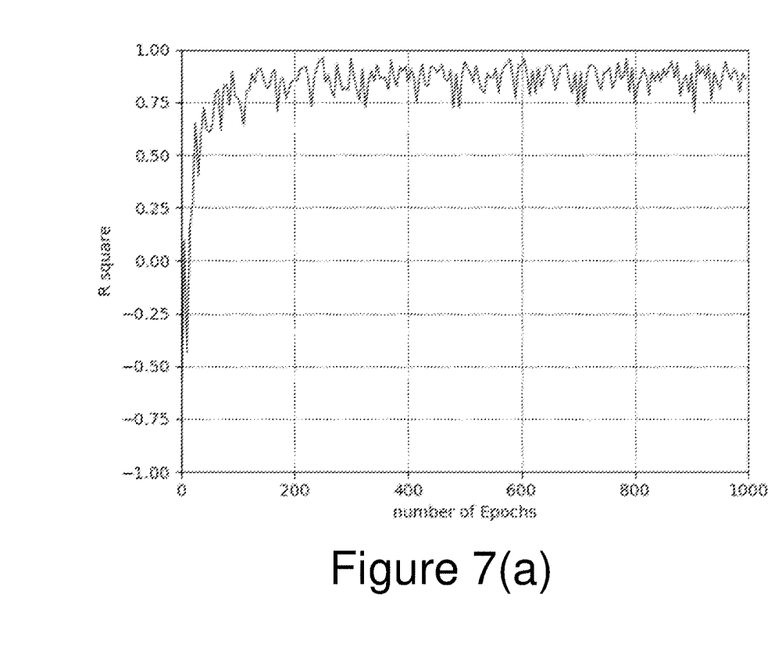
FIG. 7 shows R-squared for different numbers of microring resonators in the integrated circuit spectrometer of FIG. 1.
Figure 7B:
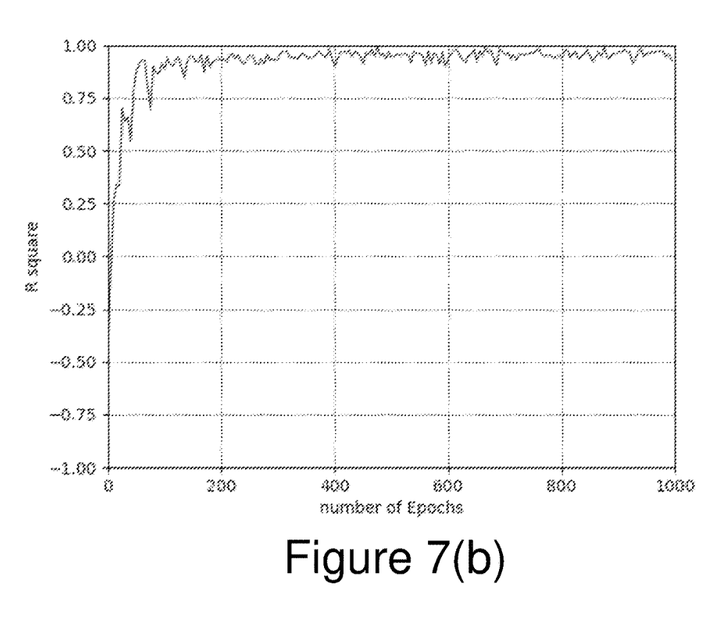
Figure 8:
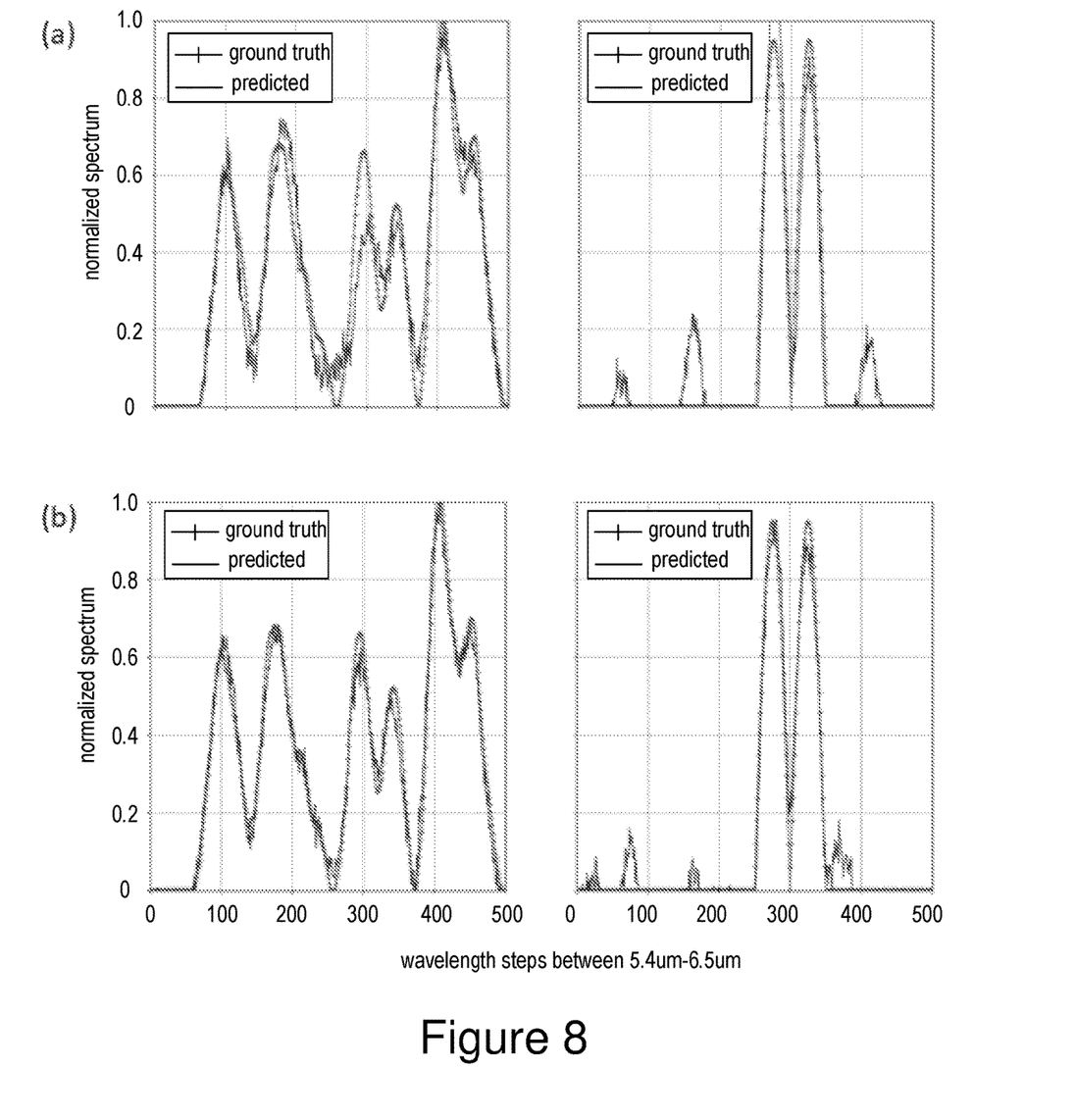
FIG. 8 shows a comparison between predicted (reconstructed) spectra and ground truth spectra for different numbers of microring resonators.

FIG. 7 shows the performance of the R squared value with different m values. The trend clearly shows that the R squared value improves with increasing m value. FIG. 8 shows the predicted spectrum with m=40 and 64, respectively. Compared to FIG. 8(a), FIG. 8(b) appears smoother and has lower noise for narrow band signal.

Performance of ANN with Different Leaky Factors

In this simulation, the performance of ANN 300 was compared with two different leaky factors used in leaky ReLU. Table 2 compares the valid MSE loss of the network with different leaky factors α. Both the MSE loss and the R squared value are improved with the increase of the α value. This shows that ANN 300 with larger α has better performance.

TABLE 2

Performance of ANN with different leaky values.

| | α = 0.1 | α = 0.5 |
|---|---|---|
| MSE | 0.03634 | 0.02361 |
| Averaged R squared | 0.9180 | 0.9659 |

Figure 9:
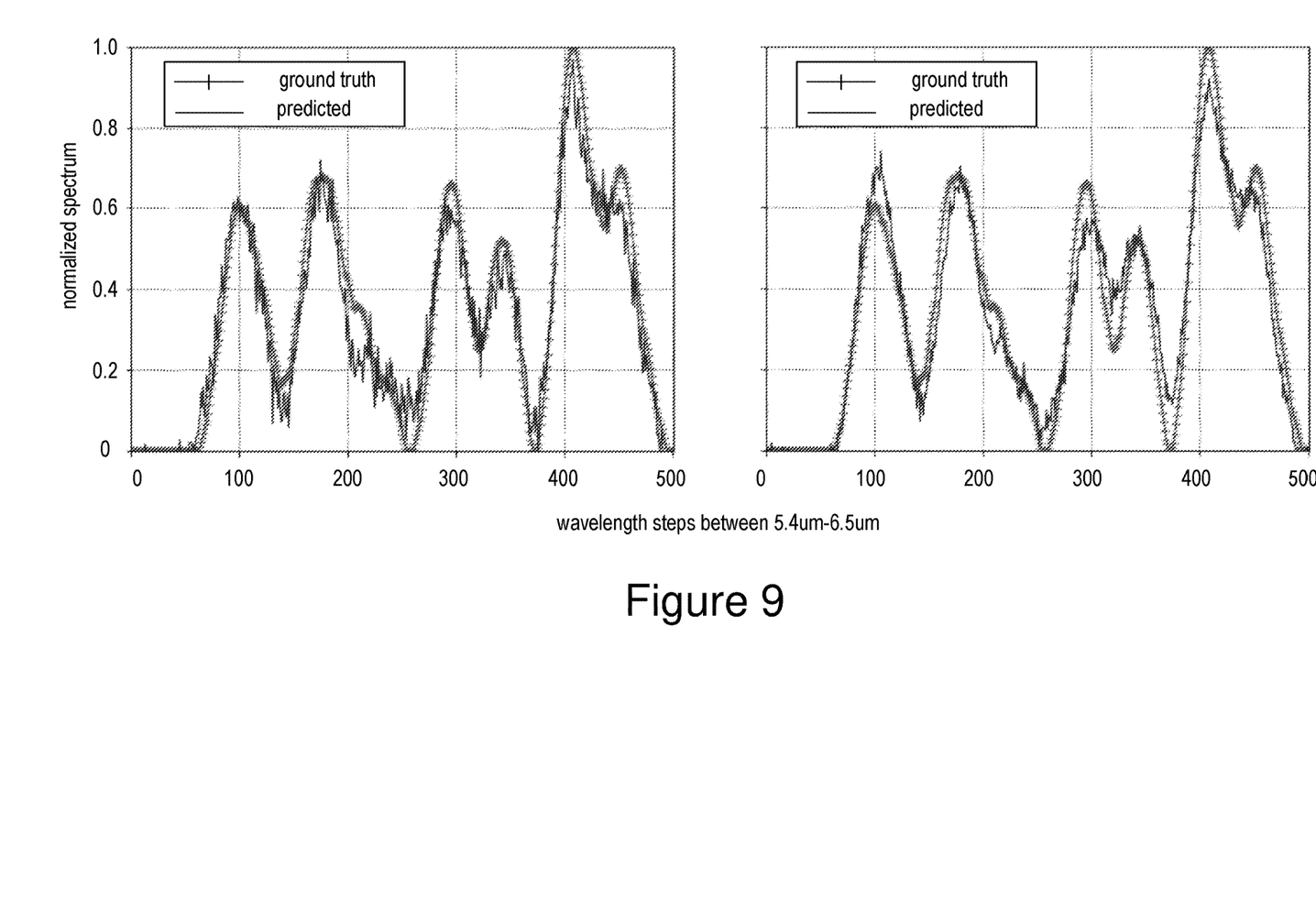
FIG. 9 shows the predicted spectrum and the ground-truth spectrum with different leaky factors for a leaky ReLU activation function of the artificial neural network of FIG. 4.

FIG. 9 compares the predicted spectrum and the ground-truth spectrum with different leaky factors. In FIG. 9(a), α is 0.1 and in FIG. 9(b), α is 0.5. It shows that the predicted spectrum generated with larger α is smoother than that generated with smaller α.

Performance of ANN With/Without ReLU After Output Layer 320

Table 3 compares the valid MSE loss and R squared value with/without the ReLU function after the output layer. It shows that by adding the ReLU constraint, the performance of the ANN is improved.

TABLE 3

Performance of ANN with/without ReLU after output layer.

| | Without ReLU | With ReLU |
|---|---|---|
| MSE | 0.02841 | 0.02361 |
| Averaged R squared | 0.9478 | 0.9659 |

Figure 10:
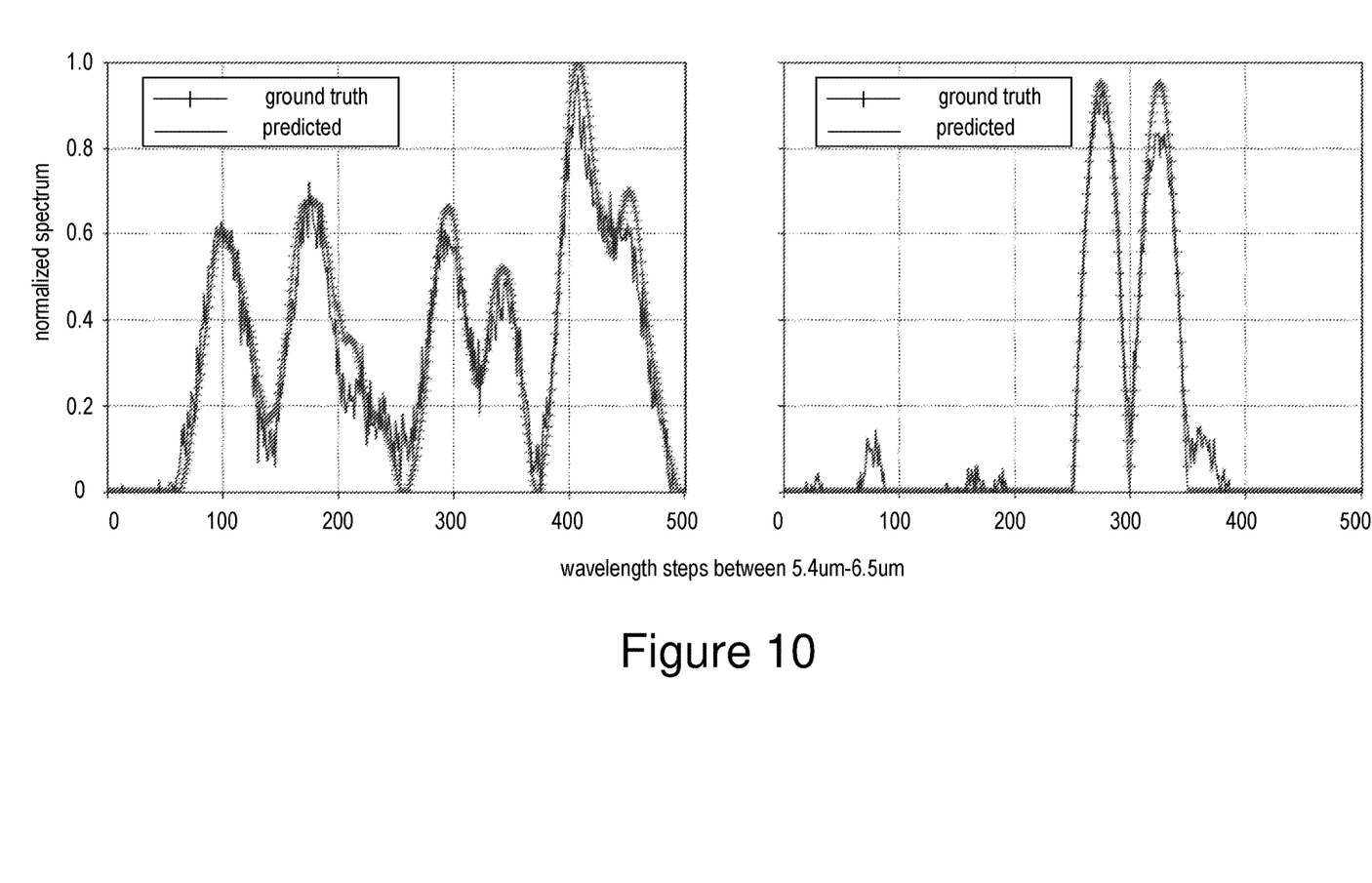
FIG. 10 shows performance of the artificial neural network with and without a ReLU layer after the output layer.

FIG. 11 compares the ground-truth spectrum and the predicted spectrum with/without ReLU after the output layer 320. It shows that ANN 300 with ReLU 322 after the output layer 320 has better performance in the narrow band situation. It has lower noise in the band where signal power is close to zero.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The invention claimed is:

1. An integrated circuit spectrometer comprising:
    a photonic circuit comprising:
        an optical input port for receiving light from a light source; and
        a filter array of microring resonators in optical communication with the optical input port, each microring resonator being characterized by a different series of resonance wavelengths;
    a plurality of detectors, each of which is associated with one of said microring resonators to detect photons from an output of the microring resonator; and
    at least one processor configured to reconstruct, from signals received at the plurality of detectors, an input spectrum of light received at the optical input port using an artificial neural network, the artificial neural network comprising:
        an input layer having a number of neurons equal to a number of detectors of the plurality of detectors;
        an output layer having a number of neurons equal to a number of wavelength points in the input spectrum such that the number of neurons in the output layer is greater than the number of neurons in the input layer;
        a plurality of hidden layers; and
        a plurality of batch normalization layers such that each hidden layer of the plurality of hidden layers feeds into a respective batch normalization layer of the plurality of batch normalization layers.

2. The integrated circuit spectrometer according to claim 1, wherein the microring resonators are arranged in parallel.

3. The integrated circuit spectrometer according to claim 2, wherein the microring resonators are optically coupled to the optical input port via a beam splitter that is arranged to split input light equally among the microring resonators.

4. The integrated circuit spectrometer according to claim 1, wherein the photonic circuit, the detectors, and the at least one processor are on a single substrate.

5. The integrated circuit spectrometer according to claim 1, wherein the detectors form a detector array.

6. The integrated circuit spectrometer according to claim 5, wherein the detector array is a MCT, InSb, InAs, PbS, PbSe, InGaAs, Si or Ge photodetector array.

7. The integrated circuit spectrometer according to claim 1, wherein the detectors are thermal detectors selected from thermopile detectors, microbolometers, or pyrodetectors with absorbers having an absorption spectrum that covers the resonance wavelengths of the resonators.

8. The integrated circuit spectrometer according to claim 1, wherein outputs of respective batch normalization layers feed into respective layers that transform the outputs according to a leaky ReLU activation function.

9. The integrated circuit spectrometer according to claim 1, wherein the artificial neural network comprises a ReLU layer after an output layer, for constraining the output layer.

10. A method of spectrometry, comprising, by at least one processor:
    receiving signals from a plurality of detectors, wherein each detector is arranged to receive optical signals produced by one of a plurality of microring resonators on receiving light having an input spectrum, each microring resonator being characterized by a different series of resonance wavelengths; and
    reconstructing the input spectrum from said signals received from the plurality of detectors using an artificial neural network, the artificial neural network comprising:
        an input layer having a number of neurons equal to a number of detectors of the plurality of detectors;
        an output layer having a number of neurons equal to a number of wavelength points in the input spectrum such that the number of neurons in the output layer is greater than the number of neurons in the input layer;
        a plurality of hidden layers; and
        a plurality of batch normalization layers such that each hidden layer of the plurality of hidden layers feeds into a respective batch normalization layer of the plurality of batch normalization layers.

11. The method according to claim 10, wherein outputs of respective batch normalization layers feed into respective layers that transform the outputs according to a leaky ReLU activation function.

12. The method according to claim 10, wherein the artificial neural network comprises a ReLU layer after an output layer, for constraining the output layer.

* * * * *